United States Patent [19]

Makinwa et al.

[11] Patent Number: 5,510,813
[45] Date of Patent: Apr. 23, 1996

[54] DATA PROCESSING DEVICE COMPRISING A TOUCH SCREEN AND A FORCE SENSOR

[75] Inventors: Kofi A. A. Makinwa; Theunis S. Baller, both of Eindhoven, Netherlands

[73] Assignee: U.S. Philips Corporation, New York, N.Y.

[21] Appl. No.: 289,829

[22] Filed: Aug. 12, 1994

[30] Foreign Application Priority Data

Aug. 26, 1993 [BE] Belgium ................. 09300875

[51] Int. Cl.⁶ .................................. G09G 3/02
[52] U.S. Cl. ................ 345/173; 345/104; 345/179; 341/33
[58] Field of Search ................... 345/173, 174, 345/175, 156, 179, 104; 178/18, 19; 341/33, 34, 22

[56] References Cited

U.S. PATENT DOCUMENTS

| | | | |
|---|---|---|---|
| 4,293,734 | 10/1981 | Pepper, Jr. | 178/18 |
| 4,475,235 | 10/1984 | Graham | 178/18 |
| 4,723,836 | 2/1988 | Kone et al. | 345/174 |
| 4,731,694 | 3/1988 | Gräbner et al. | 341/33 |
| 4,740,781 | 4/1988 | Brown | 345/174 |
| 4,853,498 | 8/1989 | Meadows et al. | 178/19 |
| 4,961,968 | 7/1989 | Hilsum et al. | 345/104 |
| 5,119,079 | 6/1992 | Hube et al. | 345/146 |
| 5,231,381 | 7/1993 | Duwaer | 345/174 |

FOREIGN PATENT DOCUMENTS

| | | | |
|---|---|---|---|
| 0340096 | 11/1989 | European Pat. Off. . | |
| 0419145 | 3/1991 | European Pat. Off. | 345/173 |

OTHER PUBLICATIONS

Research Disclosure, No. 302, Jun. 1989, Havant GB p. 456 RD30289–Touch Screen With Combined Force and Position Sensing.

*Primary Examiner*—Richard Hjerpe
*Assistant Examiner*—Doon Chow
*Attorney, Agent, or Firm*—Leroy Eason

[57] ABSTRACT

A data processing device comprises a touch screen with a touch position sensor. The position sensor is suitable to detect a touch position on the screen from a change in a current pattern in a conductive panel. The device also comprises a touch force sensor provided with a second conductive panel which extends substantially parallel to the touch screen. The screen is at least partly movable relative to the second panel in a direction transversely of the second panel. The force sensor is suitable to determine a force from a capacitance value between the touch screen and the second panel. The device is suitable for the combined processing of the position and force detected in response to touching.

13 Claims, 2 Drawing Sheets

DATA PROCESSING DEVICE COMPRISING A TOUCH SCREEN AND A FORCE SENSOR

BACKGROUND OF THE INVENTION

The invention relates to a data processing device, comprising a touch screen with a touch position sensor which comprises a first conductive panel and is suitable to detect a touch position on the screen from a change in a current pattern in the first panel. A data processing device of this kind is known from U.S. Pat. No. 4,853,498.

During use the position sensor for example applies the same electric voltage, to a plurality of locations on the first panel. When the panel is touched or approached by a finger or any other at least slightly conductive object, a capacitive effect is produced so that current is drained from the panel. The position sensor can deduce the position where the touch surface has been touched or approached by measuring the amount of current drained from the various locations on the panel whereto the voltage is applied.

Preferably, the touch force is determined simultaneously with the position. In that case, for example the thickness of lines drawn by means of the position sensor can be adjusted in proportion to the force used, a distinction can be made between different types of use, such as control of cursor motions or icon selection, on the basis of different forces, a selection of a menu item can be confirmed by exerting additional force.

SUMMARY OF THE INVENTION

It is an object of the invention to provide a data processing device which is suitable to measure the touch position as well as the touch force in response to touching.

To achieve this, the data processing device in accordance with the invention is characterized in that the device comprises a touch force sensor which is provided with a second conductive panel which is arranged substantially parallel to the touch screen which touch screen is at least partly movable relative to the second panel in a direction transversely of the second panel, the force sensor being arranged to determine a force from a capacitance value between the touch screen and the second panel, and the device being arranged for the combined processing of the position and force detected in response to touching. The touch screen and the second panel constitute respective plates of a capacitor. When a force is exerted on the touch screen, these plates move towards one another, so that the capacitance value of the capacitor changes. The capacitance value is, therefore, a fully electronically measurable measure of this force.

An embodiment of the data processing device in accordance with the invention is characterized in that the touch screen comprises a third conductive panel which is arranged between the first and the second panel, the force sensor being suitable to determine a variation of the capacitance value by means of a current flowing from the first and/or second panel to the third panel in order to charge or discharge the capacitance between the third panel on the one side and the first and/or second panel on the other side. The measurement of the capacitance value in response to a touch force could be disturbed by the capacitance of the finger or the other object touching or approaching the screen. Thus, the determination of the force is not unambiguous. These touch effects are eliminated by measuring exclusively the current to the third panel which constitutes an intermediate layer.

An embodiment of the data processing device in accordance with the invention is characterized in that the first and the third panel are movable together relative to the second panel, the force sensor being suitable to apply to the first and the third panel the same electric measurement voltage signal relative to the second panel. Because the same measurement voltages are applied to the first and the third panel, it is ensured that variations in the current to the first panel are caused only by the touch capacitance, whereas variations in the current to the third panel are caused exclusively by the force exerted. The measurement voltage signal need concern only one component of the electric voltage present between the panels. The measurement voltage signal may be, for example one spectral component of the voltage present between the panels and the layer. The other components of the voltage need not be the same.

An embodiment of the data processing device in accordance with the invention is characterized in that the first and the third panel are provided on oppositely situated faces of a substrate. The substrate may be, for example a glass plate. This can be readily implemented and offers a suitable mechanical transfer of the touch force from the touch surface to the third panel.

An embodiment of the data processing device in accordance with the invention is characterized in that the second and the third panel are substantially rigidly arranged relative to one another, the force sensor being suitable to apply to the second and the third panel the same measurement voltage signal relative to the first panel. This reduces disturbances of the measurement of the touch force which are caused by currents to the second panel and which may occur notably when the second panel is situated substantially near an outer side of the device.

The edges of the touch screen can in principle be mechanically fixed relative to the second panel. The touch force then becomes manifest as a difference in bending of the touch screen and the conductive layer. A simple and rugged force sensor can thus be realised. However, it may be that in that case the sensitivity of the force sensor is too low when the screen is touched near the edge. The sensitivity may also be too low when use is made of a touch screen of low flexibility.

An embodiment of the data processing device in accordance with the invention is characterized in that the touch screen and the second panel are resiliently connected to one another. The touch screen can thus move as a whole relative to the second panel and the described sensitivity problems will not occur.

An embodiment of the data processing device in accordance with the invention is characterized in that the touch screen is flexible, the force sensor being suitable to determine the touch force from the measured capacitance value under correction from a detected touch position. The degree of bending of a layer is dependent on the force exerted as well as on the position where force is exerted. When the edges of the layer are fixed, bending will increase as the force is exerted further from the edges. Quantitative force measurement requires correction for this effect. Preferably, the touch position as measured with the touch surface is used for this purpose.

An embodiment of the data processing device in accordance with the invention which comprises an image display face on which there are provided control electrodes for controlling an image pattern is characterized in that the control electrodes form part of the second and/or third panel. The force sensor can thus be combined with, for example a Liquid Crystal Display (LCD) screen, without a separate second panel being required. The control electrodes of an LCD consist of a number of line electrodes. When used for the force sensor, all control electrodes carry substantially the same electric voltage difference relative to the other panels, at least as far as the measurement voltage signal is concerned (which signal need only be one component of the electric voltage between the panels as has already been stated). Evidently, the further voltage components on the line electrodes may contain different control voltages for the LCD.

An embodiment of the data processing device in accordance with the invention is characterized in that the force sensor is suitable to measure the capacitance value by means of an alternating voltage of a frequency between harmonics of a line frequency for controlling the control electrodes. The capacitance value can be simply measured by means of an alternating voltage. The use of an alternating voltage enables disturbances of the force measurement due to other signals, such as the line frequency of the display, to be prevented by selective faltering (for example, by means of synchronous demodulation). For a line frequency of 15.625 Hz, for example a measurement frequency of 22 kHz can be used.

The sources liable to disturb the force measurement, for example the line drive of the display interface or the display illumination (usually driven at frequencies beyond 25 kHz) are known in advance. In that case a suitable measurement frequency can also be chosen in advance.

An embodiment of the data processing device in accordance with the invention is characterized in that it is suitable to perform interference measurements for several frequencies of the alternating voltage, in the absence of detection of touching of the touch surface, and for selecting a comparatively low interference frequency for use upon measurement of the capacitance value. In that case a suitable measurement frequency can also be chosen in the event of unknown interference sources, for example display illumination of a non-specified frequency. The detection of touching can be realised, for example by means of the touch position sensor.

The measurement frequency can be selected for once and for all upon assembly or repeatedly during use. Moreover, in the absence of detection of touching, the capacitance value can be measured in the absence of an exerted force. This value then serves as a reference in calculating the force exerted from the capacitance value.

An embodiment of the data processing device in accordance with the invention is characterized in that the second or the third panel constitutes a system of conductor tracks for a magnetic stylus position sensor. The force sensor can thus be combined with the touch surface and a magnetic position sensor.

An embodiment of the data processing device in accordance with the invention, comprising an image display face and being suitable to generate, in response to touching, an image pattern in a location on the image display face which corresponds to the detected touch position, is characterized in that the device is suitable to enlarge the image pattern as the detected force is greater. For drawing lines the image pattern may be, for example a brush element such as a circle. This pattern remains when the touch position changes; the user can thus draw lines of variable thickness by moving the touch position across the screen while varying the force.

An embodiment of the data processing device in accordance with the invention is characterized in that the device is suitable to compare the detected force with several threshold values and to execute different operations in dependence on which threshold values are exceeded. The force can thus be used, for example for selecting icons or for implementing a "double click" function as the force is greater.

These and other aspects of the invention will be described in detail hereinafter with reference to Figures herein.

DESCRIPTION OF THE PREFERRED EMBODIMENTS

Figure 1:
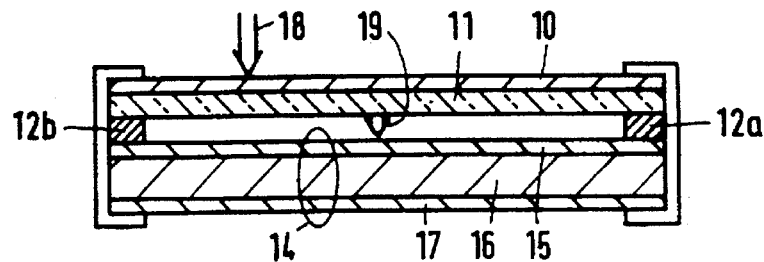
FIG. 1 is a diagrammatic side elevation of a liquid crystal display (LCD) provided with a touch screen.

FIG. 1 is a diagrammatic side elevation of a liquid crystal display (LCD) provided with a touch screen. A number of components which are not essential to the invention have been omitted for the sake of clarity. The side elevation shows successively a transparent, conductive panel 10 (for example, of indium tin oxide, or ITO), a glass substrate 11, and the LCD 14. A first control electrode 15 and a second control electrode 17 of the LCD 14 are shown, a liquid crystal layer 16 being shown therebetween. The conductive panel 10 and the control electrodes 15, 17 extend across substantially the entire surface of the LCD (perpendicularly to the plane of drawing). The glass substrate 11 and the LCD 14 are connected via resilient elements 12a,b, for example a rubber ring which extends along the entire circumference of the LCD 14 or along parts thereof.

During operation the panel 10 serves as a touch position sensor. Techniques for determining the touch position on a resistive, conductive layer are known per se. An example can be found in the cited U.S. Pat. No. 4,853,498 and also in the U.S. Pat. No. 4,293,734. In an embodiment a voltage is applied to the panel 10 by means of different electrodes (not shown) using these techniques. Under the influence of touching, this leads to a current flow through the panel 10, for example via the capacitance between the panel 10 and a touching finger and subsequently via the body of the person touching to ground. This results in measurable currents through the electrodes on the panel 10. The position of touching can be calculated from the ratio of these currents.

By touching the panel 10, a force can be exerted on the panel 10 (symbolized by an arrow 18 in the Figure). In the case of a freed position of the LCD 14, this force 18 will lead to compression of the resilient elements 12a,b and hence to displacement (symbolized by an arrow 19) of the panel 10 and the glass substrate 11 in the direction of the LCD 14. If necessary, mechanical guides can be provided so that displacement is possible exclusively in the direction of the panel. The displacement 19 is proportional to the force exerted.

The panel 10 and the first control electrode 15 of the LCD constitute the plates of a capacitor. The capacitance value of this capacitor is dependent on the distance between the plates and hence on the force. Measurement of the capacitance value enables determination of the force exerted. Because this measurement utilizes the panel 10 and the first control electrode 17, extending substantially across the entire surface of the LCD 14, the capacitance value is comparatively high so that it can be readily measured.

The capacitance value can in principle be measured by applying a known electric voltage between the panel 10 and the first control electrode 15 and by measuring the charging current starting to flow in response to said voltage (the reverse is also possible: applying a known current and measuring the resultant voltage).

The measured capacitance value, however, could be disturbed by the capacitive effect of, for example a finger touching the panel 10. Consequently, in response to the voltage an additional current may start to flow to the panel 10, without a force 18 being exerted yet. Depending on the relative magnitude of the effect caused by the capacitor and the finger, the measurement of the force could become too inaccurate.

This problem is mitigated by choosing a suitable configuration of voltage application and current measurement. Such a configuration is shown diagrammatically in FIG. 2. The Figure shows only the components which serve to measure the force; voltage sources and current meters for control of the LCD 14 and the position sensor have been omitted for the sake of clarity. The panel 10 is represented as a first capacitor plate 30, the first control electrode 15 of the LCD 14 being represented as a second capacitor plate 31 and the second control electrode 17 of the LCD 14 as a third capacitor plate 32. Between the first capacitor plate 30 and the second capacitor plate 31 (the panel 10 and the first control electrode 15) there is arranged a voltage source 35. The second capacitor plate 31 and the third capacitor plate 32 (the first and second control electrodes 15, 17 of the LCD 14) are interconnected. (Evidently, this holds only in respect of the component of the voltage between the second plate 31 and the third plate 32 whereby the capacitance is measured. As far as other components of the voltage are concerned, for example the components required for controlling the LCD, a voltage source is present between the second plate 31 and the third plate 32). In the supply lead to the second plate 31 there is inserted a current meter 36; the latter measures the current flowing from the first plate 30 and the third plate 32 to the second plate 31 (evidently, in as far as current flows from these plates 30, 32). The capacitance value, or at least the variation thereof, can be determined from the ratio of the voltage applied to 35 to the current measured at 36 (evidently, the reverse is also feasible: applying current by means of a current source 36 instead of the current meter and measuring the voltage by means of a voltmeter 35 instead of the voltage source).

The capacitive effect of touching of the panel 10 during use is thus eliminated. This is because the current drained through the panel 10 due to the finger touching the panel also has to return to the assembly formed by the much screen and the LCD, if no net charge is to be built up in the device. The return current flows, for example via the second electrode 17 of the LCD 14, when the latter is held by the user, but not via the first control electrode 15 because this electrode is situated between the panel 10 and the second control electrode 17. Thus, the current to the first plate 30 due to touching will be compensated for by the current from the third plate 32. Touching, therefore, causes only a current flow through the current meter 36 due to the pressing together of the panel 10 and the first control electrode 15, i.e. due to the desired effect.

In this respect it is assumed that the component voltages for control of the LCD between the first electrode 15 and the second electrode 17 do not interfere with the measured component of the current through the current current meter 36.

Figure 3:
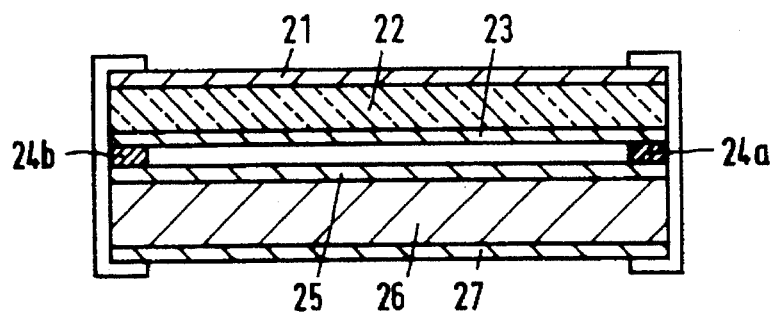
FIG. 3 is a diagrammatic cross-sectional view of a further assembly of a touch screen and an LCD.

FIG. 3 is a diagrammatic cross-sectional view of a further assembly of a further touch screen and an LCD. The cross-sectional view successively shows a first transparent, conductive panel 21, a glass substrate 22, a transparent conductive layer 23, resilient elements 24a,b, a transparent first control electrode 25, a liquid crystal layer 26, and a second control electrode 27. The first control electrode 25 and the transparent conductive layer 23 constitute a second panel and a third panel, respectively.

When a force is exerted, the touch screen, i.e. the assembly formed by the first panel 21, the glass substrate 22 and the third panel 23, will move in the direction of the first control electrode 25, so that the capacitance value of the capacitor formed by the third panel 23 and the first control electrode 25 (the second panel) increases.

Figure 4:
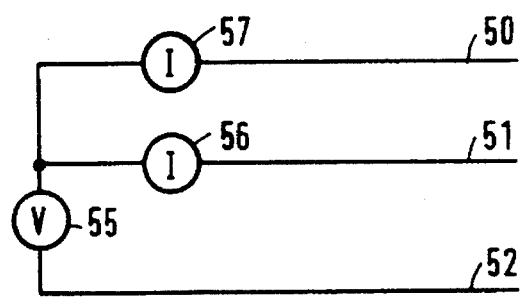
FIG. 4 shows a further configuration for voltage application and current measurement on a touch screen.

An attractive method of measuring this capacitance value is illustrated by way of the configuration shown in FIG. 4. FIG. 4 shows diagrammatically a first, a second and a third capacitor plate, 50, 51, 52, respectively, which correspond to the first panel 21, the third panel 23 and the second panel (the first control electrode 25), respectively. A voltage source 55 is connected between the second plate 51 and the third plate 52. The first plate 50 and the second plate 51 are interconnected (which means that no voltage difference exists between these two plates in as far as the components of the voltage are concerned which are used for the force measurement. In the supply lead to the second plate 51 there is inserted a current meter 56; the latter measures the current flowing from the first plate 50 and the third plate 52 to the second plate 51. In addition, a further current meter 57 is symbolically shown in the supply lead to the first plate 50.

Figure 2:
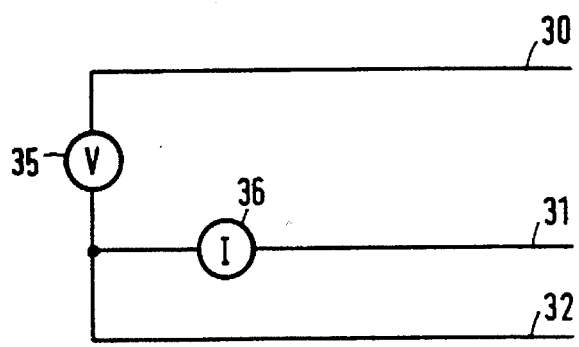
FIG. 2 shows a configuration for voltage application and current measurement on a touch screen.

The operation of this configuration is the same as that described with reference to FIG. 2, except that the voltage is now applied between the third panel 23 and the second panel (the first control electrode 25), i.e. again between the two adjoining plates which are movable relative to one another.

The voltage sources for the measurement of the touch position and the control of the LCD have again been omitted in FIG. 4. During use different voltages are applied to the first panel 21 and the control electrode 25 for measuring the touch position and for controlling the LCD, respectively. The further current meter 57 symbolizes a number of current meters connected to the first panel 21 in various locations. These current meters serve to measure the currents to the first plate wherefrom the touch position is determined.

Upon measurement of the touch position, the third panel 23 also serves as a shield between the first panel 21 and the control electrode 25, 27. Stray fields from the control electrodes 25, 27 are intercepted by the third panel 23 so that they do not cause a current in the first panel 21. The measurement of the touch position, therefore, is not disturbed by stray fields (conversely, the control of the LCD is not disturbed by the measurement voltage on the first panel 21, be it that the latter is a smaller effect).

Figure 5:
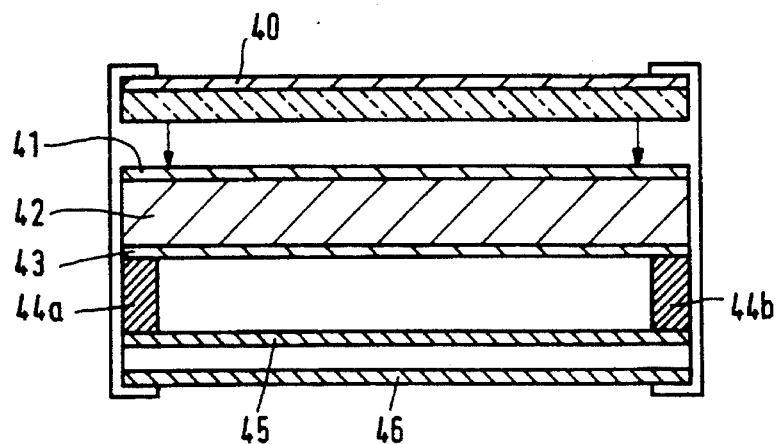
FIG. 5 is a diagrammatic cross-sectional view of a further assembly of a touch screen and an LCD.

FIG. 5 is a diagrammatic cross-sectional view of a further assembly of a further much screen and an LCD. The cross-sectional view successively shows a first conductive panel 40, a first control electrode 41, a liquid crystal layer 42, a second control electrode 43, resilient elements 44a,b, a third panel 45, and a second panel (a conductive layer 46).

When a force is exerted on the first panel 40, the assembly formed by the first panel 40, the first control electrode 41, the liquid crystal layer 42, and the second control electrode 43 will move towards the third panel 45, so that the capacitance value of the capacitor formed by the third panel 45 and the second control electrode 43 increases. This capacitance value is preferably measured by means of a configuration as shown in FIG. 2, in which the first, the second and the third plate 30, 31, 32, respectively, correspond to the second control electrode 43, the third panel 45 and the conductive layer 46 (the second panel), respectively. As described above, the conductive layer 46 serves to prevent undesirable capacitive effects, for example when the LCD is placed on a metal table.

If necessary, a conductor pattern of a magnetic position sensor (also known as a digitizer tablet) can be provided between the second electrode 43 and the third panel 45. This sensor serves to measure the location where a stylus generating magnetic fields touches the display. In that case the conductor pattern of the sensor can serve as a capacitor plate instead of the second control electrode 45.

Figure 6:
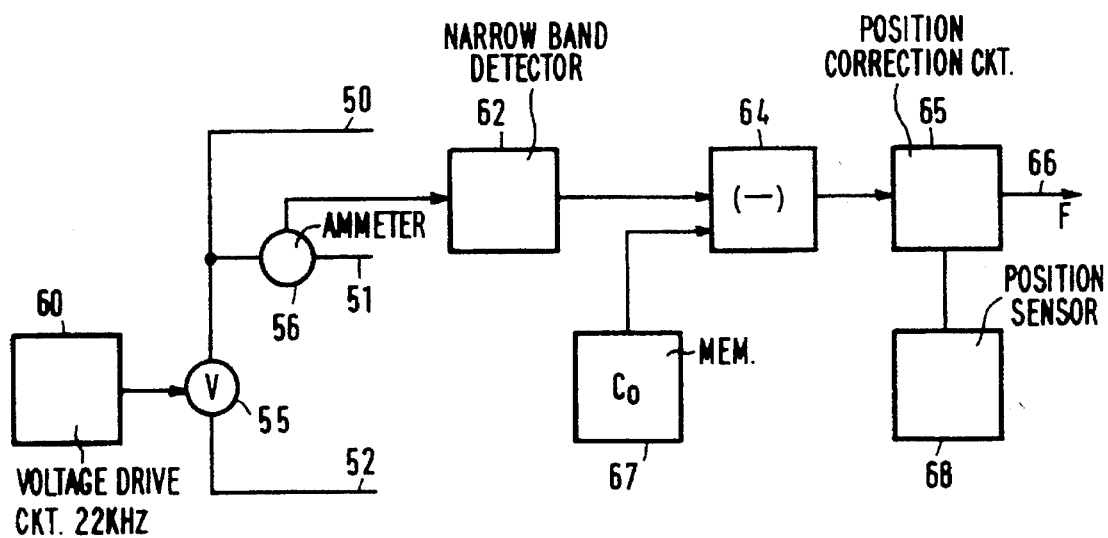
FIG. 6 shows an embodiment of a circuit for processing the measurement of the exerted force.

FIG. 6 shows an embodiment of a circuit for processing the measurement of the force exerted. This Figure comprises, by way of example, the configuration of FIG. 4 with the first plate 50, the second plate 51, the third plate 52, the voltage source 55 and the current meter 56.

The circuit comprises a drive circuit 60 for driving the voltage source. The current meter is connected to a cascade of successively a narrow-band detector 63, a subtraction means 64, and a position-dependent correction means 65. A memory 67 for the zero force capacitance is coupled to the subtraction means 64. A position sensor 68 is coupled to the position-dependent correction means 65.

During operation the drive circuit 60 generates an alternating voltage of a given frequency, for example 22 kHz, which is applied between the second plate 51 and the third plate 52 by means of the voltage source 55. In response thereto a current flows through the current meter 56. The current measured is applied to the narrow-band detector 62. The amplitude of the current is a measure of the capacitance value. The narrow-band detector 62 detects substantially exclusively signals of the generated frequency (22 kHz), and outputs a signal which is proportional to the amplitude of the current. The subtraction means subtracts the quiescent value therefrom, i.e. the current amplitude in the absence of an exerted force.

The signal at the output of the subtraction means 64 is in principle a measure of the force exerted. However, it has been found that the capacitance variation can depend not only on the force but also on the location where the force is exerted. This is notably the case when the resilient elements 24a,b are replaced by non-flexible or hardly flexible connections. In that case the capacitance variation is due mainly to bending of the glass substrate 22. The degree of bending of the glass substrate 22 for a given force is dependent on the location where the force is exerted. Typical bending amounts to 1 mm in response to a force of 10N exerted at the center of the substrate 22, and to substantially 0 mm in response to a force exerted on the connection between the second panel 23 and the first electrode 25. For the sake of compactness of the device and in order to minimize parallax between the first panel 21 and the LCD layer 26, the distance between the second panel 23 and the first electrode 25 preferably is hardly greater than this bending; in that case the bending determines a substantial part of the touch force effect.

The position-dependent correction means 65 and the position sensor 68 are provided to correct for the location-dependency of the relation between the touch force and the variation of the capacitance value. For the position sensor 68 use is preferably made of the first panel 10. In the correction means the measured capacitance variation is multiplied by a correction factor which is dependent on the location where the touch force is exerted.

The correction factor can in principle be calculated by utilizing the equations for elastic deformation of thin plates. This calculation can be performed either for each touch or only once and for all, after which the correction factor is stored in a look-up table in the device as a function of the location. However, it has been found in practice that a simple approximated relation between the location and the correction factor suffices.

In a simple but very suitable embodiment the correction factor is taken to be proportional to the distance between the location where the force is exerted and the nearest location where the third panel 23 is mechanically connected to the first electrode 25. In another suitable version the correction factor is taken to be proportional to the sum of the absolute values of the x and y coordinates of the touch location, measured relative to the centre of the screen.

For the measurement frequency, for example 22 kHz is used; at this frequency no disturbance is experienced from the customary drive frequency of the control signals for the display (for example, 15,625 Hz) or harmonics thereof and, moreover, this frequency is below the frequencies used for background illumination (backlighting) of the LCD (typically 25 kHz and higher). This prevents other signals from disturbing the force measurement. Conversely, this frequency is also chosen to prevent disturbances in the image produced on the display by the control electrodes 25, 27, but this effect is smaller.

The control electrode 25 at one side of the liquid crystal layer 26 is composed of a number of line electrodes. In as far as the measurement frequency (22 kHz) is concerned, all these electrodes receive the same potential. Evidently, as far as image frequencies (necessary for generating the image) are concerned, different potentials are usually applied to different line electrodes. This can be realised, for example by using respective voltage sources for controlling the image between a common junction and the various line electrodes, said common junction being connected to the third panel 23 via the voltage source 55.

The bandwidth of the narrow band detector 62 corresponds to the speed of force variations to be measured and typically amounts to a few tens of Herz, for example 50 Hz. The narrow-band detector 62 preferably utilizes synchronous detection under the control of the drive circuit 60.

The memory 67 for the zero force is preferably loaded by storing the output signal of the narrow-band detector at an instant at which no force is exerted on the screen. The absence of an exerted force can be detected by means of the position sensor when the latter does not measure a variation of the current pattern through the first panel 21. The measurement of the current flow to the outer plate 50 thus serves for touch detection and the measurement of the current to the intermediate plate 51 serves for force measurement.

The measurement frequency of the force sensor, generated by the drive circuit 60, is chosen so that the other signals in the LCD and the position sensor cause as little interference as possible. If necessary, in the absence of a touch force the interference amplitude can be measured at different measurement frequencies, after which one of the least disturbed frequencies can be chosen for force measurements. This choice of frequency can either be performed once and for all upon design or assembly, or be repeated at regular intervals when no force is exerted. The latter can be performed, for example under the control of a processor in the device.

The measurement has been explained in conjunction with frequency selective measurement. Alternatively time multiplex measurement is feasible, the components of the voltages and currents used for the force measurement then being the voltages and currents in a time slot in which no LCD control signal is applied to the display.

We claim:

1. A touch screen data processing device comprising:

a touch screen having a first conductive panel, said first panel comprising a touch position sensor for detecting a touch position on said screen from a change in a current pattern in said first panel;

a second conductive panel parallel to said first panel and coextensive therewith, the second panel being spaced from the first panel in a direction transverse thereto, the second panel constituting portion of an image display;

resilient support means situated between the peripheries of said first and second panels for permitting partial movement of said screen toward said second panel, so that a touch force on said screen causes at least partial narrowing of the spacing between said screen and said second panel and a resulting change in electrical capacitance therebetween over an area substantially coextensive with said screen;

a touch force sensor comprising said second panel, for determining the value of a touch force on said screen by detection of the resulting change in capacitance between said screen and said second panel; and means for performing combined processing of data produced by both the position sensor and the force sensor in response to a touch force on said screen.

2. A device as claimed in claim 1, wherein the touch screen comprises a third conductive panel which is arranged between the first and the second panel and coextensive therewith, the force sensor being suitable to determine a variation of the capacitance value by measurement of a current flowing from the first and/or second panel to the third panel in order to charge or discharge the capacitance between the third panel on the one side and the first and/or second panel on the other side.

3. A device as claimed in claim 2, wherein the first and the third panel are movable together relative to the second panel, the force sensor being suitable to apply to the first and the third panel the same electric measurement voltage signal relative to the second panel.

4. A device as claimed in claim 2, wherein the first and the third panel are provided on oppositely situated faces of a substrate.

5. A device as claimed in claim 2, wherein the second and the third panel are substantially rigidly arranged relative to one another, the force sensor being suitable to apply to the second and the third panel the same measurement voltage signal relative to the first panel.

6. A device as claimed in claim 2, further comprising an image display face on which there are provided control electrodes for controlling an image pattern, with the control electrodes forming part of the second and/or third panel.

7. A device as claimed in claim 6, wherein the force sensor is suitable to measure the capacitance value by means of an alternating voltage of a frequency between harmonics of a line frequency for controlling the control electrodes.

8. A device as claimed in claim 7, wherein the force sensor is suitable to perform interference measurements for several frequencies of the alternating voltage, in the absence of detection of touching of the touch surface, and for selecting a comparatively low interference frequency for use upon measurement of the capacitance value.

9. A device as claimed in claim 1, wherein the touch screen is flexible, the force sensor being suitable to determine the touch force from the measured capacitance value under correction of a detected touch position.

10. A device as claimed in claim 1, wherein the second panel constitutes a system of conductor tracks for a magnetic stylus position sensor.

11. A device as claimed in claim 1, further comprising an image display face and being suitable to generate, in response to touching, an image pattern, in a location on the image display face which corresponds to the detected touch position, with the device being suitable to enlarge the image pattern when the detected force is greater than a threshold force value.

12. A device as claimed in claim 1, wherein the device is suitable to compare the detected force with several threshold values and to execute different operations in dependence on which threshold values are exceeded.

13. A device as claimed in claim 2, wherein the second or the third panel constitutes a system of conductor tracks for a magnetic stylus position sensor.

* * * * *